United States Patent
Pallamreddy et al.

(10) Patent No.: US 8,051,143 B2
(45) Date of Patent: Nov. 1, 2011

(54) SHARING SESSIONS BETWEEN WEB-BASED APPLICATIONS

(75) Inventors: Prasanth Pallamreddy, Fremont, CA (US); Vinod Mehra, Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1036 days.

(21) Appl. No.: 11/250,729

(22) Filed: Oct. 14, 2005

(65) Prior Publication Data

US 2007/0088831 A1    Apr. 19, 2007

(51) Int. Cl.
*G06F 15/16* (2006.01)
(52) U.S. Cl. ........ 709/218; 709/217; 709/219; 709/227; 709/228; 709/229
(58) Field of Classification Search .................. 709/203, 709/204, 205, 206, 217, 218, 219, 223, 224, 709/227–229; 707/2, 8, 10, 201, 202, 205; 713/156, 170, 185, 200; 718/104
See application file for complete search history.

(56) References Cited

U.S. PATENT DOCUMENTS

| | | | | |
|---|---|---|---|---|
| 5,708,780 A | * | 1/1998 | Levergood et al. | 709/229 |
| 6,035,404 A | * | 3/2000 | Zhao | 726/6 |
| 6,950,815 B2 | | 9/2005 | Tijare et al. | |
| 2001/0047477 A1 | * | 11/2001 | Chiang | 713/170 |
| 2002/0078212 A1 | * | 6/2002 | Besaw et al. | 709/228 |
| 2002/0095584 A1 | * | 7/2002 | Royer et al. | 713/183 |
| 2002/0194357 A1 | | 12/2002 | Harris et al. | |
| 2004/0098595 A1 | * | 5/2004 | Aupperle et al. | 713/185 |
| 2004/0143645 A1 | * | 7/2004 | Cheenath | 709/218 |
| 2005/0028162 A1 | * | 2/2005 | Allen | 718/104 |
| 2005/0138122 A1 | * | 6/2005 | Boehringer et al. | 709/205 |
| 2006/0143217 A1 | * | 6/2006 | Stanev et al. | 707/102 |

OTHER PUBLICATIONS

International Preliminary Report on Patentability for PCT/US2006/003016, dated Apr. 16, 2008, 5 pages.
International Search Report for PCT/US2006/003016, dated Sep. 28, 2007, 1 page.

* cited by examiner

*Primary Examiner* — Philip Chea
*Assistant Examiner* — Peter Shaw
(74) *Attorney, Agent, or Firm* — Fliesler Meyer LLP (57) ABSTRACT

In accordance with embodiments, there are provided mechanisms and methods for sharing sessions between web-based applications. These mechanisms and methods can enable embodiments to provide sharing sessions between web-based applications. A method embodiment includes receiving a request to access a second web application from a user currently accessing a first web application. Session information from a first session between the user and the first web application is provided to a second session established between the user and the second web application. Access to the second web application is provided responsive to the user's request, using session information from the first session.

16 Claims, 5 Drawing Sheets

SHARING SESSIONS BETWEEN WEB-BASED APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to techniques for providing interconnectivity between one or more application servers and one or more enterprise information systems, and more particularly to a mechanism for sharing sessions between web-based applications.

BACKGROUND

Since its inception in 1995, the Java™ programming language has become increasingly popular. (Java™ is a trademark of Sun Microsystems, Inc.) Java, which is an interpreted language, enabled the creation of applications that could be run on a wide variety of platforms. This ability to function across a variety of different client platforms, i.e., platform independence, and Java's relatively easy implementation of network applications has resulted in the use of Java, as well as other programming languages that provide platform independence, in endeavors as basic as personal web pages to endeavors as complex as large business-to-business enterprise systems.

Since Java applications, as well as applications embodied using other programming languages, and the Enterprise Information Systems (EIS) to which the applications connect, may be provided by many different vendors, a mechanism that enables these disparate computational entities to communicate with one another was needed. The Java 2 Platform Enterprise Edition (J2EE) is a specification that addresses such needs. A J2EE compliant architecture provides a mechanism for integrating applications residing on J2EE-compliant application servers with enterprise information systems.

In order for applications to connect to users at clients as well as application and services at the EIS, a connection mechanism is required. Many installations employ the Hyper-Text Transfer Protocol (HTTP) to enable applications to connect with users and other computational entities. The HTTP is a stateless protocol in which each user communicates with a specific application using a specific session. Accordingly, in present approaches, users will have multiple sessions created if they are accessing multiple web-based applications on a J2EE container.

Unfortunately, such conventional approaches do not resolve all connection issues. For example, information associated with a particular HTTP session is only visible within the web-based application being corresponding to that HTTP session. Accordingly, users interacting with a particular application using a first session will not have access to data stored in data objects of that application when the user accesses a second application using a second session.

What is needed is an improved mechanism for sharing sessions between web-based applications.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for sharing sessions between web-based applications. These mechanisms and methods can enable embodiments to provide the capability to share sessions between web-based applications. By way of non-limiting example, the ability of embodiments to provide sharing of sessions between web-based applications can enable users to share information associated with a session established with a single web-based application with other web-based applications. Users may be human or computational entities. For instance, a shopping cart could be shared among completely disparate and otherwise unassociated web sites without losing contents of the shopping cart each time a switch between the web sites is made.

In an embodiment, a method for sharing sessions between web-based applications is provided. The method embodiment includes receiving a request to access a second web application from a user currently accessing a first web application. Session information from a first session between the user and the first web application is provided to a second session established between the user and the second web application. Access to the second web application is provided responsive to the user's request, using session information from the first session.

In an embodiment, a method for creating a sharable session object is provided. In a method embodiment, a wrapper object is created for a session object associated with a first web application. The wrapper object is created for use by the second web application. The wrapper object delegates invocations to methods to the session object associated with the first web application. The wrapper object returns context information associated with the second session for the second web application responsive to invocations to a getServletContext( ) method that returns the current context.

Figure 1:
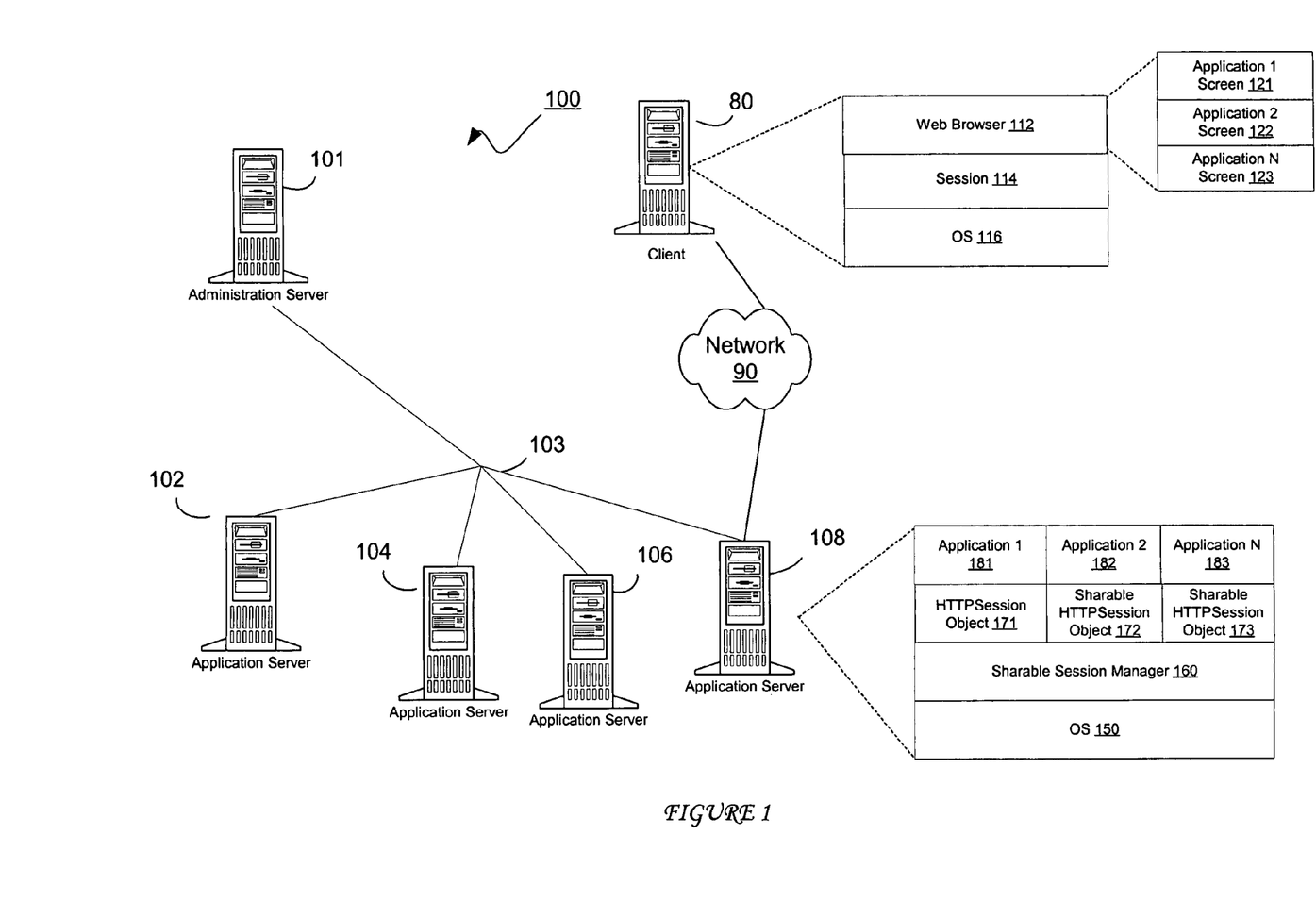
FIG. 1 is functional block diagram of an example computing environment in which techniques for sharing sessions between web-based applications in an embodiment may be implemented.

FIG. 1 is functional block diagram of an example computing environment implementing a connector architecture in which techniques for sharing sessions between web-based applications in an embodiment may be implemented. As shown in FIG. 1, an enterprise application environment 100 includes a management framework in which one or more applications 181-183 executing on one or more application servers 102-108 may be managed using a central point administration server 101. In an embodiment, enterprise application environment 100 may conform to the Java 2 Extended Edition (J2EE) specification. A communications connection 103 connects administration server 101 with the application servers 102-108. Connection 103 may include a network, shared memory interface or other types of communication interconnects.

A client 80 may access one or more applications 181-183 on one or more of the application servers 102-108. Client 80 may be connected with the application server(s) 102-108 via a network 90, for example, which may include one or more networks of any topology and supporting any protocol and may include the Internet. In an alternative configuration, client 80 may be coupled directly to the application environment 100 via connection 103.

Application servers 102-108 embodiments can be configured from a variety of hardware and software products. The application servers 102-108 may run Java or other programming language environment, and may be configured to provide access to resources internal to the application servers 102-108, as well as resources reachable by the application servers 102-108. Resources can include applications, services, databases web sites and any other computer based resource. In one embodiment, the application servers 102-108 utilize WebLogic® Server from BEA systems of San Jose, Calif.

As used herein, the term application is intended to be broadly construed to include any application, program or process resident on one or more computing devices capable of providing services to a requestor or other recipient, including without limitation network based applications, web-based server resident applications, web portals, search engines, photographic, audio or video information storage applications, e-Commerce applications, backup or other storage applications, sales/revenue planning, marketing, forecasting, accounting, inventory management applications and other business applications and other contemplated computer implemented applications. The applications may be exposed to clients as local or remote interfaces, or both. An application component may be at least a subset of an application, and can be implemented for example and without limitation, an enterprise java bean (EJB), Java Server Page (JSP), or servlet, that is deployed, managed, or executed on an application server 108.

A web browser 112 provides a user interface mechanism on client 80 that enables a user or users to access one or more applications 181-183 on the application server(s) 102-108. The web browser 112 displays one or more application screens 121-123 corresponding to the applications 181-183 being accessed on the application server(s) 102-108. An operating system (OS) 116 supports the function of the client 80 and the browser 112. In accordance with embodiments, OS 116 need support only a single session 114 that may be shared among multiple applications 181-183 to provide interface between the applications 181-183 and the web browser 112.

Application server 108 includes a sharable session manager 160 that provides for creation, management and clean-up of sharable session objects among the applications 181-183 stored on one or more of the application server 108. (Other applications servers 102-106 may also include such sharable session capability in embodiments.) When a user accesses a first web application (for example application 1 181 in FIG. 1) and creates a session 114, sharable session manager 160 creates an HttpSession object 171. The web application 181 becomes a parent for this HttpSession object 171. When the same user accesses another web application (for example application 2 182 in FIG. 1), the sharable session manager 160 looks up the HTTPSession object 171 corresponding to the session that was created for session 114, wraps the HTTPSession object 171 with a sharable HttpSession object 172 and provides the user with this sharable HttpSession object 172. The user can now lookup any object within the second Session that was inserted during interactions with the first web application 1 181. An operating system (OS) 115 supports the function of the application server 108, sharable session manager 160 and applications 181-183. The HttpSession objects 171-173 each have one and only one parent. The web-based application which first created the session 114, i.e., application 1 181, automatically becomes a parent. The remaining web-based applications that access session 114, i.e., applications 182-183, act as surrogates. In an embodiment, only the parent application 181 is responsible for the lifecycle of the session 114.

In an embodiment, sharable HttpSession objects 172-173 implement the HttpSession interface and act as delegators for the original session 114. The sharable HttpSession objects 172-173 delegate all the methods to the HttpSession object 171 except for getServletContext( ), which returns the current context corresponding to the application 182-183 that the session 114 is being accessed in. HttpSession objects are mechanisms used to track user sessions. As defined by the Java Servlet Specification, HttpSession objects have visibility within the scope of a Java web-based application. For further information regarding HttpSession objects, reference may be had to the Java Servlet Specification 2.4, Chapter SRV.7, the entirety of which is incorporated herein by reference. The HttpSession interface includes the following methods:

a. getAttribute(String)
    i. public java.lang.Object getAttribute(java.lang.String name)
    ii. Returns the object bound with the specified name in this session, or null if no object is bound under the name.
  b. getAttributeNames()
    i. public java.util.Enumeration getAttributeNames()
    ii. Returns an Enumeration of String objects containing the names of all the objects bound to this session.

c. getCreationTime()
  i. public long getCreationTime()
  ii. Returns the time when this session was created, measured in milliseconds since midnight Jan. 1, 1970 GMT.
d. getId()
  i. public java.lang.String getId()
  ii. Returns a string containing the unique identifier assigned to this session. The identifier is assigned by the servlet container and is implementation dependent.
e. getLastAccessedTime()
  i. public long getLastAccessedTime()
  ii. Returns the last time the client sent a request associated with this session, as the number of milliseconds since midnight Jan. 1, 1970 GMT, and marked by the time the container received the request. Actions that your application takes, such as getting or setting a value associated with the session, do not affect the access time.
f. getMaxInactiveInterval()
  i. public int getMaxInactiveInterval()
  ii. Returns the maximum time interval, in seconds, that the servlet container will keep this session open between client accesses. After this interval, the servlet container will invalidate the session. The maximum time interval can be set with the setMaxInactiveInterval method. A negative time indicates the session should never timeout.
g. getServletContext()
  i. public javax.servlet.ServletContext getServletContext()
  ii. Returns the ServletContext to which this session belongs.
h. invalidate()
  i. public void invalidate()
  ii. Invalidates this session then unbinds any objects bound to it.
  iii. Returns true if the client does not yet know about the session or if the client chooses not to join the session. For example, if the server used only cookie based sessions, and the client had disabled the use of cookies, then a session would be new on each request.
i. removeAttribute(String)
  i. public void removeAttribute(java.lang.String name)
  ii. Removes the object bound with the specified name from this session. If the session does not have an object bound with the specified name, this method does nothing. After this method executes, and if the object implements HttpSession-BindingListener, the container calls HttpSessionBinding-Listener.value-Unbound. The container then notifies any HttpSessionAttributeListeners in the web application.
j. setAttribute(String, Object)
  i. public void setAttribute(java.lang.String name, java.lang.Object value)
  ii. Binds an object to this session, using the name specified. If an object of the same name is already bound to the session, the object is replaced. After this method executes, and if the new object implements HttpSession-BindingListener, the container calls HttpSessionBinding-Listener.valueBound. The container then notifies any HttpSessionAttributeListeners in the web application. If an object was already bound to this session of this name that implements HttpSession-BindingListener, its HttpSessionBindingListener.value-Unbound method is called. If the value passed in is null, this has the same effect as calling remove-Attribute()
k. setMaxInactiveInterval(int)
  i. public void setMaxInactiveInterval(int interval)
  ii. Specifies the time, in seconds, between client requests before the servlet container will invalidate this session. A negative time indicates the session should never timeout.

The foregoing mechanisms and methods can enable embodiments to provide the capability to share sessions between web-based applications. By way of non-limiting example, the ability of embodiments to provide sharing of sessions between web-based applications can enable users to share information associated with a session established with a single web-based application with other web-based applications. For instance, a shopping cart could be shared among completely disparate and otherwise unassociated web sites without losing contents of the shopping cart each time a switch between the web sites is made.

While the present invention is described with reference to an embodiment in which techniques for sharing sessions between web-based applications implemented using executable programs written in the Java™ programming language, the present invention is not limited to the J2EE Architecture nor the Java™ programming language. Embodiments may be practiced using other interconnectivity specifications or programming languages, i.e., JSP and the like without departing from the scope of the embodiments claimed.

Figure 2A:
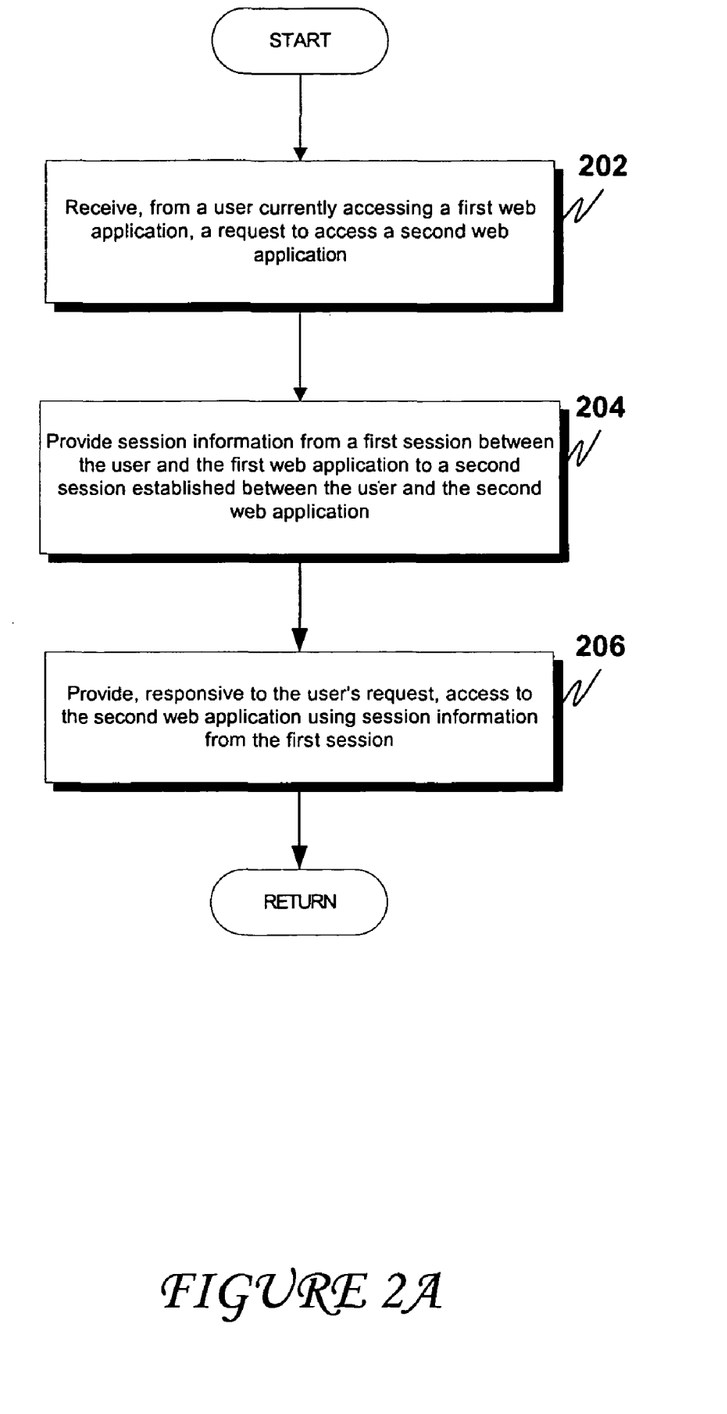
FIG. 2A is an operational flow diagram illustrating a high level overview of a technique for sharing sessions between web-based applications in an embodiment.

FIG. 2A is an operational flow diagram illustrating a high level overview of a technique for sharing sessions between web-based applications in an embodiment. The technique for sharing sessions between web-based applications shown in FIG. 2A is operable with an application server, such as application server 108 of FIG. 1, for example. As shown in FIG. 2A, a request to access a second web application is received from a user currently accessing a first web application (block 202). Session information from a first session between the user and the first web application is provided to a second session established between the user and the second web application (block 204). Access to the second web application is provided responsive to the user's request, using session information from the first session (block 206).

Figure 2B:
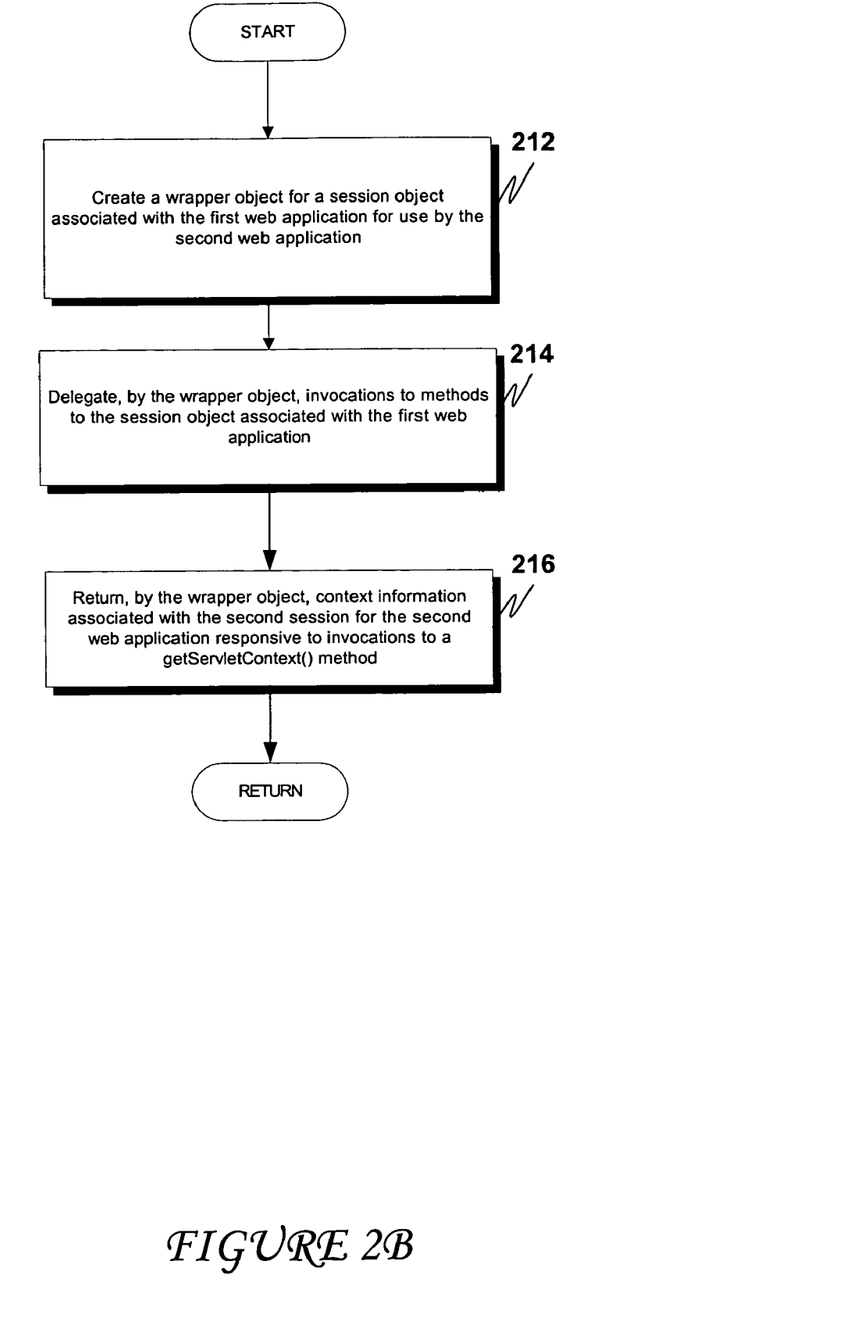
FIG. 2B is an operational flow diagram illustrating a high level overview of a technique for creating a sharable session object in an embodiment.

FIG. 2B is an operational flow diagram illustrating a high level overview of a technique for creating a sharable session object in an embodiment. The technique for creating a sharable session object shown in FIG. 2B is operable with an application server, such as application server 108 of FIG. 1, for example. As shown in FIG. 2B, a wrapper object is created for a session object associated with the first web application (block 212). The wrapper object is created for use by the second web application. The wrapper object delegates invocations to methods to the session object associated with the first web application (block 214). The wrapper object returns context information associated with the second session for the second web application responsive to invocations to a getServletContext() method (block 216).

One wrapper embodiment is illustrated by the following example:

```
<code>
import javax.servlet.http.*
import javax.servlet.*;
public class SharedHttpSession implements HttpSession {
    private HttpSession session;
```

-continued

```
    private ServletContext context;
    public SharedSessionData(HttpSession s, ServletContext ctx) {
        this.session = s;
        this.context = ctx;
    }
    public HttpSession getSession( ) {
        return this.session;
    }
    public ServletContext getServletContext( ) {
        return this.context;
    }
    // TODO: delegate all the remaining methods of HttpSession to
'session' instance
}
</code>
```

Figure 3:
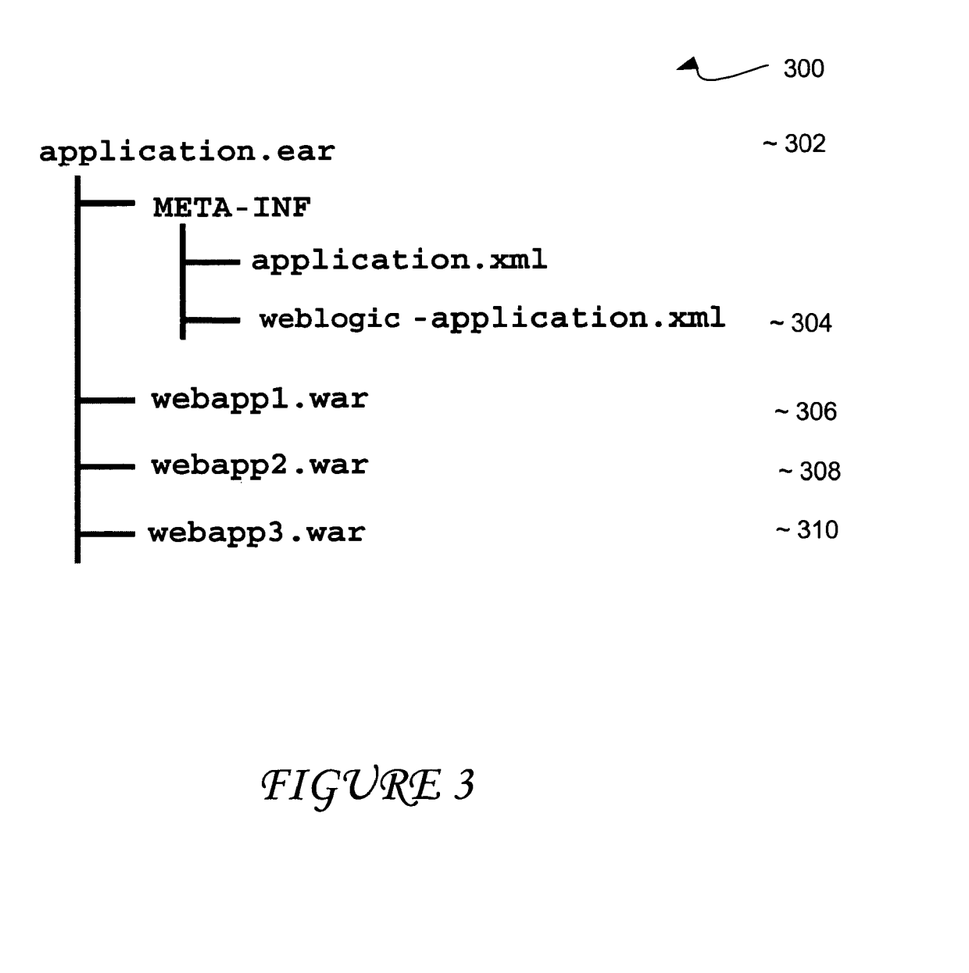
FIG. 3 is a relationship diagram illustrating a high level overview of a layout of web-based applications within an application container in an embodiment in an embodiment.

FIG. 3 is a relationship diagram illustrating a high level overview of a layout of web-based applications within an application container in an embodiment. As shown in FIG. 3, an example application container 300 includes a weblogic specific deployment descriptor 304—weblogic-application.xml. Container 300 further includes a plurality of web-based applications 306-310, which may be installed on one or more application server(s) 102-108. Users can enable web-based applications to share the same session, by configuring a session descriptor at the application level in the weblogic-application.xml deployment descriptor. To enable Web-based applications to share the same session, set the sharing-enabled attribute in the session descriptor to true in the weblogic-application.xml deployment descriptor. In an embodiment, web-based applications do not, by default, share sessions.

The session descriptor configuration specified at the application level overrides any session descriptor configuration specified at the Web application level for all of the Web-based applications in the application. If the sharing-enabled attribute is set to true at the Web application level, it will be ignored.

Web-based applications in an application are automatically started using the same session instance when the session descriptor is so specified in the weblogic-application.xml deployment descriptor and the sharing-enabled attribute is set to true, as in the following example:

```
<?xml version="1.0" encoding="ISO-8859-1"?>
<weblogic-application xmlns="http://www.bea.com/ns/weblogic/90";;>
    ...
    <session-descriptors
        <persistent-store-type>memory</persistent-store-type>
        <sharing-enabled>true</sharing-enabled>
        ...
    </session-descriptor>
...
</weblogic-application>
```

In an embodiment, if listeners (HttpSessionListener and HttpSessionAttributeListener) are configured in the web-based application descriptor, then all listeners in all the web-based applications will receive notifications. The notifications are initiated by the parent web-based application of the session.

In an embodiment, the session related configuration data is provided in the Application level and all web-based applications will inherit that information, thus ensuring homogeneous configuration among all web-based applications.

In an embodiment, session tracking is enabled with Http cookies or url-rewriting. In an embodiment, objects that are put in the HttpSession are visible to the base application classloader. In other words, the classes for objects put in the HttpSession are made available at the application level.

In an embodiment, receiving, from a user currently accessing a first web application, a request to access a second web application includes receiving, from a user currently accessing a first web application, a request to access a second web application, the first web application and the second web application associated with a common container.

In an embodiment, receiving, from a user currently accessing a first web application, a request to access a second web application includes determining, based upon the identity of the request that the user already has established a first session with the first web application.

In an embodiment, providing session information from a first session between the user and the first web application to a second session established between the user and the second web application, wherein the session information is provided as a non-persistent data object includes creating a sharable session object storing session context from the first web application for use by the second web application. In an embodiment, creating a sharable session object storing session context from the first web application for use by the second web application includes creating a data object storing session context from the first web application for use by the second web application. In an embodiment, creating a data object storing session context from the first web application for use by the second web application includes creating a wrapper object for a session object associated with the first web application for use by the second web application; delegating, by the wrapper object, invocations to methods to the session object associated with the first web application; and returning, by the wrapper object, context information associated with the second session for the second web application responsive to invocations to a getServletContext() method.

In an embodiment, providing, responsive to the user's request, access to the second web application using session information from the first session includes establishing, from the viewpoint of the user, a second session with the second web application, the second session having context data from the first session with the first web application.

In an embodiment, providing, responsive to the user's request, access to the second web application using session information from the first session includes establishing inheritance by the second session of context data from the first session.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for sharing sessions between web-based applications as discussed herein.

Figure 4:
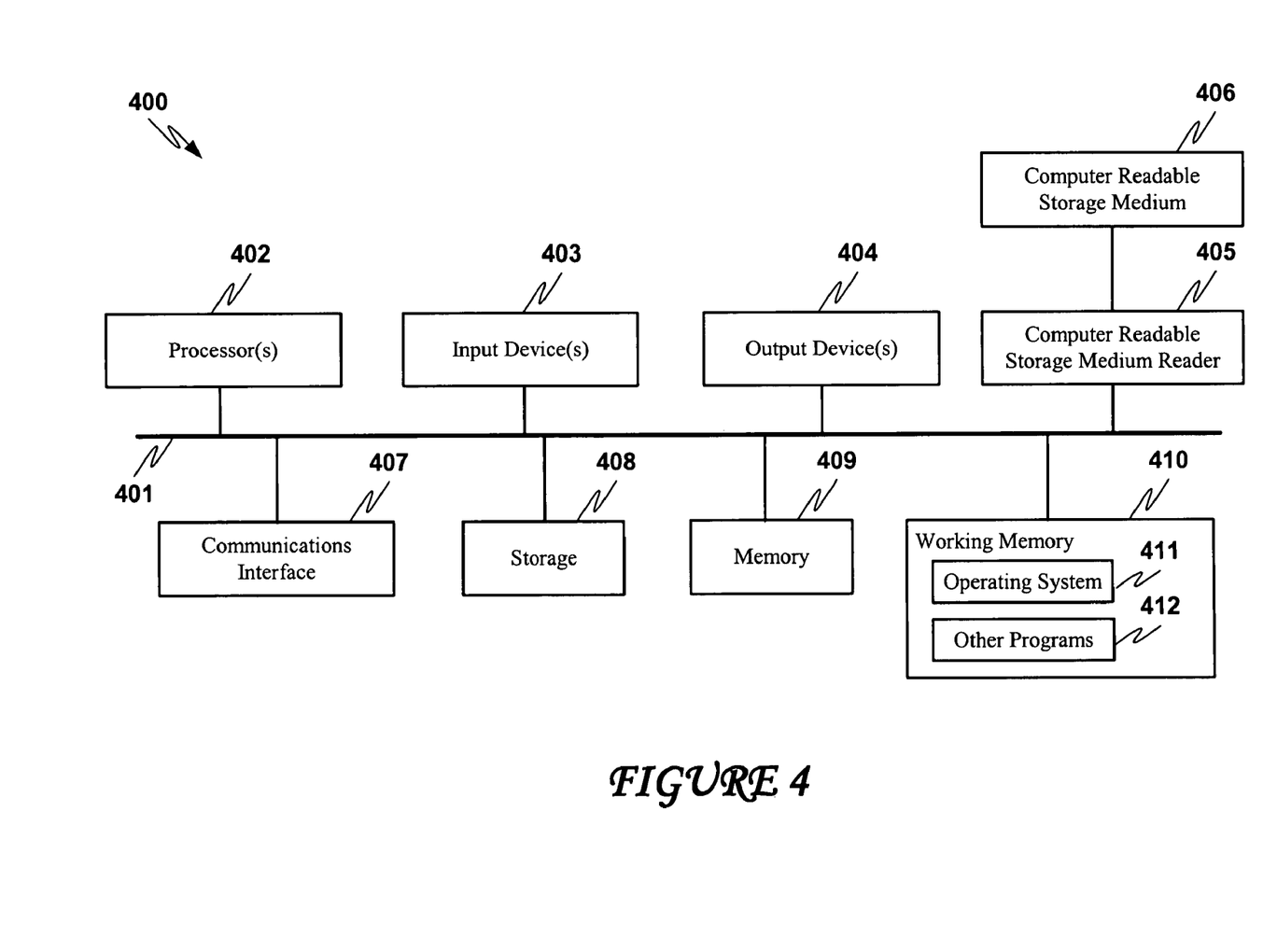
FIG. 4 is a hardware block diagram of an example computer system, which may be used to embody one or more components in an embodiment.

FIG. 4 illustrates an exemplary processing system 400, which can comprise one or more of the elements of FIG. 1. Turning now to FIG. 4, an exemplary computing system is illustrated that may comprise one or more of the components of FIG. 1. While other alternatives might be utilized, it will be presumed for clarity sake that components of the systems of FIG. 1 are implemented in hardware, software or some combination by one or more computing systems consistent therewith, unless otherwise indicated.

Computing system 400 comprises components coupled via one or more communication channels (e.g., bus 401) including one or more general or special purpose processors 402, such as a Pentium®, Centrinog, Power PC®, digital signal processor ("DSP"), and so on. System 400 components also include one or more input devices 403 (such as a mouse, keyboard, microphone, pen, and so on), and one or more output devices 404, such as a suitable display, speakers, actuators, and so on, in accordance with a particular application. (It will be appreciated that input or output devices can also similarly include more specialized devices or hardware/software device enhancements suitable for use by the mentally or physically challenged.)

System 400 also includes a machine readable storage media reader 405 coupled to a machine readable storage medium 406, such as a storage/memory device or hard or removable storage/memory media; such devices or media are further indicated separately as storage 408 and memory 409, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 407 may also be included, such as a modem, DSL, infrared, RF or other suitable transceiver, and so on for providing inter-device communication directly or via one or more suitable private or public networks or other components that may include but are not limited to those already discussed.

Working memory 410 further includes operating system ("OS") 411 elements and other programs 412, such as one or more of application programs, mobile code, data, and so on for implementing system 400 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 412 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 408 or memory 409) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for sharing sessions between a plurality of web-based applications, the method comprising:

accessing one of the plurality of web applications on an application server by a user, wherein each of the plurality of web applications are disparate and unassociated web applications, and wherein upon accessing the one of the plurality of web applications a session and a session object are created, and wherein said session object stores session information associated with the session in a computer readable storage medium, and wherein the one of the plurality of web applications is designated as a parent web application for the session object;

receiving, during the accessing of the parent web application, a request to access a different one of the plurality of web applications by the user;

determining that the user has already established the session with the parent web application by a sharable session manager;

generating by the sharable session manager a sharable wrapper object associated with the session object of the parent application responsive to said request if the session has been determined to have already been established, said sharable wrapper object containing a method for obtaining session information and a set of delegated methods, and wherein the session information is accessible to each web application accessed by the user through the sharable wrapper object;

providing the session information from the session to the sharable wrapper object, wherein the sharable wrapper object delegates all method invocations to the session object except for the method to obtain servlet context information, wherein if the method to obtain servlet content information is invoked, then the current context corresponding to the different one of the plurality of web applications that the session is being accessed in is provided to the client, otherwise if the delegated method to obtain session information is invoked, then providing the session information to the different one of the plurality of web applications includes receiving an invocation of the method to obtain session information at the sharable wrapper object, returning session information from the session object associated with the session in response to said invocation, and providing access to the different one of the plurality of web applications using the session information from the session object; and wherein the user accesses the plurality of web applications using the session information from the session object.

2. The method of claim 1, wherein receiving during the accessing of the one of the plurality of web applications, a request to access a different one of the plurality of web applications comprises:

receiving, from a user currently accessing the one of the plurality of web applications, a request to access a different one of the plurality of web applications, the one of the plurality of web applications and the different one of the plurality of web applications associated with a common container.

3. The method of claim 1, further comprising:

establishing, from a viewpoint of the user, the sharable wrapper object with the different one of the plurality of web applications, the sharable wrapper object having context data from the session with the one of the plurality of web applications.

4. The method of claim 1, wherein providing the session information further comprises:

establishing inheritance by the sharable wrapper object of context data from the session.

5. The method of claim 1 wherein the one of the plurality of web applications and a different one of the plurality of web applications are disparate and unassociated web applications, and wherein the session is currently active.

6. The method of claim 1, further comprising:

looking up one or more objects directly within the sharable wrapper object of the different one of the plurality of web applications wherein said one or more objects are inserted during interactions with the session of the one of the plurality of web applications.

7. The method of claim 1, wherein the set of delegated methods include one or more of the following: a method to obtain an object bound to the session, a method to obtain all objects bound to the session, a method to obtain a creation time of the session, a method to obtain an identifier assigned to the session, a method to obtain a last access time of the session, a method to obtain the maximum time the session will be open, a method to invalidate the session, a method to remove an object bound to the session, a method to bind an object to the session, and a method to specify a time between client requests before the session will be invalidated.

8. The method of claim 1, wherein the plurality of web applications are executing on one or more application servers.

9. A non-transitory computer-readable storage medium carrying one or more sequences of instructions for sharing sessions between web-based applications, which instructions, when executed by one or more processors, cause the one or more processors to carry out the steps of:

accessing one of the plurality of web applications on an application server by a user, wherein each of the plurality of web applications are disparate and unassociated web applications, and wherein upon accessing the one of the plurality of web applications a session and a session object are created, and wherein said session object stores session information associated with the session in a computer readable storage medium, and wherein the one of the plurality of web applications is designated as a parent web application for the session object;

receiving, during the accessing of the parent web application, a request to access a different one of the plurality of web applications by the user;

determining that the user has already established the session with the parent web application by a sharable session manager;

generating by the sharable session manager a sharable wrapper object associated with the session object of the parent application responsive to said request if the session has been determined to have already been established, said sharable wrapper object containing a method for obtaining session information and a set of delegated methods, and wherein the session information is accessible to each web application accessed by the user through the sharable wrapper object;

providing the session information from the session to the sharable wrapper object wherein the sharable wrapper object delegates all method invocations to the session object except for the method to obtain servlet context information, wherein if the method to obtain servlet content information is invoked, then the current context corresponding to the different one of the plurality of web applications that the session is being accessed in is provided to the client, otherwise if the delegated method to obtain session information is invoked, then providing the session information to the different one of the plurality of web applications includes receiving an invocation of the method to obtain session information at the sharable wrapper object, returning session information from the session object associated with the session in response to said invocation, providing access to the different one of the plurality of web applications using the session information from the session object; and wherein the user accesses the plurality of web applications using the session information from the session object.

10. The non-transitory computer-readable storage medium as recited in claim 9, wherein the instructions for carrying out the step of receiving during the accessing of the first web application, a request to access a second web application include instructions for carrying out the step of:

receiving, from a user currently accessing a one of the plurality of web applications, a request to access a different one of the plurality of second web applications, the one of the plurality of web applications and the different one of the plurality of second web applications associated with a common container.

11. The non-transitory computer-readable storage medium as recited in claim 9, further comprising instructions for carrying out the step of:

establishing, from a viewpoint of the user, the sharable wrapper object with the different one of the plurality of second web applications, the sharable wrapper object having context data from the session with the one of the plurality of web applications.

12. The non-transitory computer-readable storage medium as recited in claim 9, further comprising instructions for carrying out the step of:

establishing inheritance by the sharable wrapper object of context data from the one of the plurality of web applications.

13. The non-transitory computer-readable storage medium of claim 9 wherein the one of the plurality of web applications and a different one of the plurality of web applications are disparate and unassociated web applications, and wherein the first session is currently active.

14. The non-transitory computer-readable storage medium of claim 9 wherein the plurality of web applications are executing on one or more application servers.

15. An apparatus for sharing sessions between web-based applications, the apparatus comprising:

a processor; and one or more stored sequences of instructions which, when executed by the processor, cause the processor to carry out the steps of:

accessing one of the plurality of web applications on an application server by a user, wherein each of the plurality of web applications are disparate and unassociated web applications, and wherein upon accessing the one of the plurality of web applications a session and a session object are created, and wherein said session object stores session information associated with the session in a computer readable storage medium, and wherein the one of the plurality of web applications is designated as a parent web application for the session object;

receiving, during the accessing of the parent web application, a request to access a different one of the plurality of web applications by the user;

determining that the user has already established the session with the parent web application by a sharable session manager;

generating by the sharable session manager a sharable wrapper object associated with the session object of the parent application responsive to said request if the session has been determined to have already been established, said sharable wrapper object containing a method for obtaining session information and a set of delegated methods, and wherein the session information is accessible to each web application accessed by the user through the sharable wrapper object;

providing the session information from the session to the sharable wrapper object, wherein the sharable wrapper object delegates all method invocations to the session object except for the method to obtain servlet context information, wherein if the method to obtain servlet content information is invoked, then the current context corresponding to the different one of the plurality of web applications that the session is being accessed in is provided to the client, otherwise if the delegated method to obtain session information is invoked, then providing the session information to the different one of the plurality of web applications includes receiving an invocation of the method to obtain session information at the sharable wrapper object, returning session information from the session object associated with the session in response to said invocation, and providing access to the different one of the plurality of web applications using the session information from the session object; and wherein the user accesses the plurality of web applications using the session information from the session object.

16. The apparatus of claim 15 wherein the plurality of web applications are executing on one or more application servers.

\* \* \* \* \*

UNITED STATES PATENT AND TRADEMARK OFFICE
CERTIFICATE OF CORRECTION

PATENT NO. : 8,051,143 B2
APPLICATION NO. : 11/250729
DATED : November 1, 2011
INVENTOR(S) : Pallamreddy et al.

It is certified that error appears in the above-identified patent and that said Letters Patent is hereby corrected as shown below:

In column 4, line 27, delete "HTTPSession" and insert -- HttpSession --, therefor.

In column 4, line 29, delete "HTTPSession" and insert -- HttpSession --, therefor.

In column 5, line 6, delete "getld()" and insert -- getId() --, therefor.

In column 5, line 7, delete "getld()" and insert -- getId() --, therefor.

In column 6, line 2, delete "value-Unbound" and insert -- valueUnbound --, therefor.

In column 6, line 4, after "remove-Attribute()" insert -- . --.

In column 7, line 49, delete "<session-descriptors" and insert -- <session-descriptor> --, therefor.

In column 9, line 33, delete "Centrinog," and insert -- Centrino®, --, therefor.

In column 12, line 33, in Claim 9, delete "object" and insert -- object, --, therefor.

In column 12, line 47-48, in Claim 9, after "invocation," insert -- and --.

In column 13, line 15, in Claim 13, delete "first session" and insert -- session --, therefor.

Signed and Sealed this
Seventh Day of February, 2012

David J. Kappos
*Director of the United States Patent and Trademark Office*